(12) United States Patent
Shin (10) Patent No.: US 11,337,555 B2
(45) Date of Patent: May 24, 2022

(54) INDUCTION FRYER

(71) Applicant: BUMIL INDUSTRIAL CO., LTD., Incheon (KR)

(72) Inventor: Young Suk Shin, Incheon (KR)

(73) Assignee: BUMIL INDUSTRIAL CO., LTD., Incheon (KR)

( * ) Notice: Subject to any disclaimer, the term of this patent is extended or adjusted under 35 U.S.C. 154(b) by 448 days.

(21) Appl. No.: 16/468,213

(22) PCT Filed: Dec. 16, 2016

(86) PCT No.: PCT/KR2016/014807
§ 371 (c)(1),
(2) Date: Jun. 10, 2019

(87) PCT Pub. No.: WO2018/110748
PCT Pub. Date: Jun. 21, 2018

(65) Prior Publication Data
US 2019/0387927 A1    Dec. 26, 2019

(51) Int. Cl.
| A47J 37/12 | (2006.01) |
| H05B 6/06 | (2006.01) |
| H05B 6/12 | (2006.01) |

(52) U.S. Cl.
CPC ....... *A47J 37/1261* (2013.01); *A47J 37/1219* (2013.01); *A47J 37/1266* (2013.01); *A47J 37/1295* (2013.01); *H05B 6/062* (2013.01); *H05B 6/12* (2013.01)

(58) Field of Classification Search
CPC ............. A47J 37/1261; A47J 37/1219; A47J 37/1266; A47J 37/1295; H05B 6/062; H05B 6/12; H05B 6/1209; H05B 2213/07

USPC .......... 219/621, 624, 627, 660, 663; 99/333, 99/403, 422
See application file for complete search history.

(56) References Cited

FOREIGN PATENT DOCUMENTS

| JP | 2012-254248 A | 12/2012 | |
| KR | 10-1362195 B1 | 2/2014 | |
| KR | 10-1652023 B1 | 8/2016 | |
| KR | 10-1657926 B1 | 9/2016 | |
| KR | 10-1664343 B1 | 10/2016 | |
| KR | 101664343 | * 10/2016 | .............. A47J 37/12 |

* cited by examiner

*Primary Examiner* — Phuong T Nguyen
(74) *Attorney, Agent, or Firm* — Novick, Kim & Lee, PLLC; Jae Youn Kim (57) ABSTRACT

An induction fryer includes: a case having a space with an open upper part; a lid installed by means of a hinge at an upper part of the case; a frying container, installed in the case, for containing oil so as to be able to fry frying ingredients; a frying basket having a space and a fixing rod formed therein so as to be lifted up and down; an induction heating unit installed on an outer circumferential surface of the frying container and having a coil and a plurality of magnets fixed to an assembly body so that electric energy is converted into thermal energy by electromagnetic induction and; and a control unit for electrically controlling the induction heating unit so that the frying ingredients being fried by the electromagnetic induction phenomenon, wherein the coil is fixed only by fixing the magnet to the assembly body without using an adhesive.

3 Claims, 12 Drawing Sheets

INDUCTION FRYER

TECHNICAL FIELD

The present invention relates to an induction fryer, and more particularly, to an induction fryer, which can increase temperature to a desired temperature using electromagnetic induction heating to fry ingredients when a user puts a certain amount of oil and prevent oil from being acidified by remaining heat.

BACKGROUND ART

Fried food made by frying ingredients in oil forms a great part of food culture, so lots of studies on development of fryers which can easily make fried food delicious are on the way.

Especially, an electromagnetic induction heating fryer includes an electromagnetic induction heating means having a heat source for generating heat and a frying means for frying ingredients by the heat source of the electromagnetic induction heating means, and the electromagnetic induction heating means and the frying means are separated from each other.

The frying means includes: a frying means case forming an outward appearance; a frying container mounted inside the frying means case and filled with a certain amount of oil; a frying basket mounted inside the frying container to allow a user to put frying ingredients thereon; and a lid mounted on the frying means case to cover the frying container.

The electromagnetic induction heating means includes: a heating means case forming an outward appearance; an upper ceramic plate mounted on an inner upper surface of the heating means case; a magnetic line generating coil mounted below the upper ceramic plate; a power supply unit for supplying electric current to the magnetic line generating coil; a temperature sensor mounted to get in contact with the upper ceramic plate to sense temperature of the upper ceramic plate; a micom for regulating current supply of the power supply unit according to sensing of the temperature sensor; and a cooling fan for cooling interior heat.

Now, the structure of the electromagnetic induction heating means will be described. The user puts the frying means on the electromagnetic induction heating means so that the frying container is located on an upper portion of the upper ceramic plate, and then, pours oil into the frying container. After that, when the power supply unit supplies high frequency electric current to the magnetic line generating coil, a line of magnetic force is generated from the magnetic line generating coil. While the line of magnetic force passes through the bottom surfaces of the upper ceramic plate and the frying container, eddy current is induced into the interior to generate heat. The generated heat heats the oil in the frying container. Moreover, when the oil is heated to the desired temperature, the user opens the cover, puts frying ingredients into the frying basket. So, the frying ingredients are fried by the heated oil. Temperature of the oil is kept to the desired temperature when the temperature sensor and the micom regulate electric current supplied to the magnetic line generating coil.

However, as described above, because the magnetic line generating coil is located below the frying basket, when the oil is heated, the line of magnetic force is not spread out evenly. Therefore, because there is a temperature difference inside the frying container, the frying ingredients are not fried evenly.

Moreover, because a conventional electromagnetic induction heating means mounted on an outer face of a frying vessel is mostly fixed on the frying vessel using glue or the like, a magnetic line generating coil is moved before the glue is hardened, so it is difficult to mount the electromagnetic induction heating means at a correct position.

Furthermore, the conventional electromagnetic induction heating means has further problems in that it takes much time to manufacture it since a worker has to wait for fixing of the magnetic line generating coil, and in that it needs a space for keeping the magnetic line generating coil till the magnetic line generating coil is completely fixed to the heating means case.

DISCLOSURE

Technical Problem

Accordingly, the present invention has been made in view of the above-mentioned problems occurring in the prior art, and it is an object of the present invention to provide an induction fryer, which can increase temperature to a desired temperature using electromagnetic induction heating to fry ingredients when a user puts a certain amount of oil into the fryer.

It is another object of the present invention to provide an induction fryer which can lower manufacturing time and personnel expenses since an induction heating unit mounted on an outer face of a frying container is formed by a simple assembly.

It is a further object of the present invention to provide an induction fryer which a coil and a magnet are fixed just by mounting the magnet in a state where the coil is mounted on an assembly body without using any glue to fix the coil and the magnet.

It is a still further object of the present invention to provide an induction fryer which can maintain a fixed distance that the assembly body having the magnet and the coil is separated from a frying vessel in order to easily cause the electromagnetic induction heating phenomenon.

Technical Solution

To accomplish the above object, according to the present invention, there is provided an induction fryer including: a case having a predetermined space with an open upper part; a lid mounted at an upper part of the case to be opened and closed by a hinge; a frying container mounted in the case for containing oil to fry frying ingredients; a frying basket having a space for holding the frying ingredients and having a fixing rod to lift the frying basket up and down in the frying container; an induction heating unit mounted on an outer circumferential surface of the frying container and having an assembly body and a coil and a magnet, which are fixed to the assembly body so that electric energy is converted into thermal energy by electromagnetic induction; and a control unit for electrically controlling the induction heating unit to fry the frying ingredients by the electromagnetic induction phenomenon.

Moreover, the frying basket includes: a basket body mounted in the frying container to go in and out so that the frying ingredients can be fried by oil; fixing rods mounted on the side of the basket body to be combined with seating members mounted at an upper portion of the case body; and a basket cover mounted at one side of the lid by a cover piece and a fixing piece to be combined with the upper portion of the basket body.

Furthermore, the induction heating unit includes: a plurality of assembly bodies mounted on the outer circumferential surface of the frying container; a coil mounted along outer circumferential surfaces of the assembly bodies; a plurality of magnets which fixes the coil and is fixed to upper fixing protrusions and lower fixing protrusions of the assembly bodies by forced fitting.

Additionally, each of the assembly bodies includes: a retaining protrusion formed at one side; a retaining groove formed at the other side to correspond to the retaining protrusion; magnet fixing members having the upper fixing protrusions and the lower fixing protrusions, wherein each of the upper fixing protrusions is formed at an upper portion of one side of the assembly body and has a mounting slot and each of the lower fixing protrusions has a mounting groove formed at a lower portion of the outer face of the assembly body to correspond to the upper fixing protrusion; a combining protrusion which is mounted between the upper fixing protrusions so that the circular assembly body can be fixed on the inner face of the case; and a fixing protrusion which is formed between the upper fixing protrusions and to which an end of the coil is fixed to the fixing protrusion so that the assembly body can be electrically connected with the control board.

In addition, the control unit includes: a control box having a predetermined space and mounted on the case; an operating panel having a plurality of buttons to control the induction heating unit and mounted on the front surface of the control box; and a control board mounted on the rear surface of the operating panel and having a circuit and a micro controller unit to control the electromagnetic induction phenomenon of the induction heating unit for controlling power supply and setting frying temperature and time.

Advantageous Effects

As described above, the induction fryer according to the present invention can provide fried food with good texture since accelerating evaporation of moisture from the surface of the frying ingredients and frying while maintaining moisture of the frying ingredients.

Moreover, the induction fryer according to the present invention can prevent acidification of oil, extend use time of the oil and prevent the fried food from being soaked with oil by preventing remaining heat from being continuously supplied to the fried food after the ingredients are fried in oil.

Furthermore, the induction fryer according to the present invention can be manufactured into various sizes according to outer circumferences of containers since pieces of an assembly body are connected with each other.

Additionally, the induction fryer according to the present invention can increase work convenience and lower manufacturing time and personnel expenses since the coil is fixed just by fixing the magnet to the assembly body without using glue to fix the coil and magnet.

In addition, the induction fryer according to the present invention can maintain the fixed distance that the assembly body having the magnet and the coil is separated from the frying container in order to easily cause the electromagnetic induction heating phenomenon.

MODE FOR INVENTION

Hereinafter, technical structures of an induction fryer according to exemplary embodiments of the present invention will be described with reference to the accompanying drawings.

Figure 1:
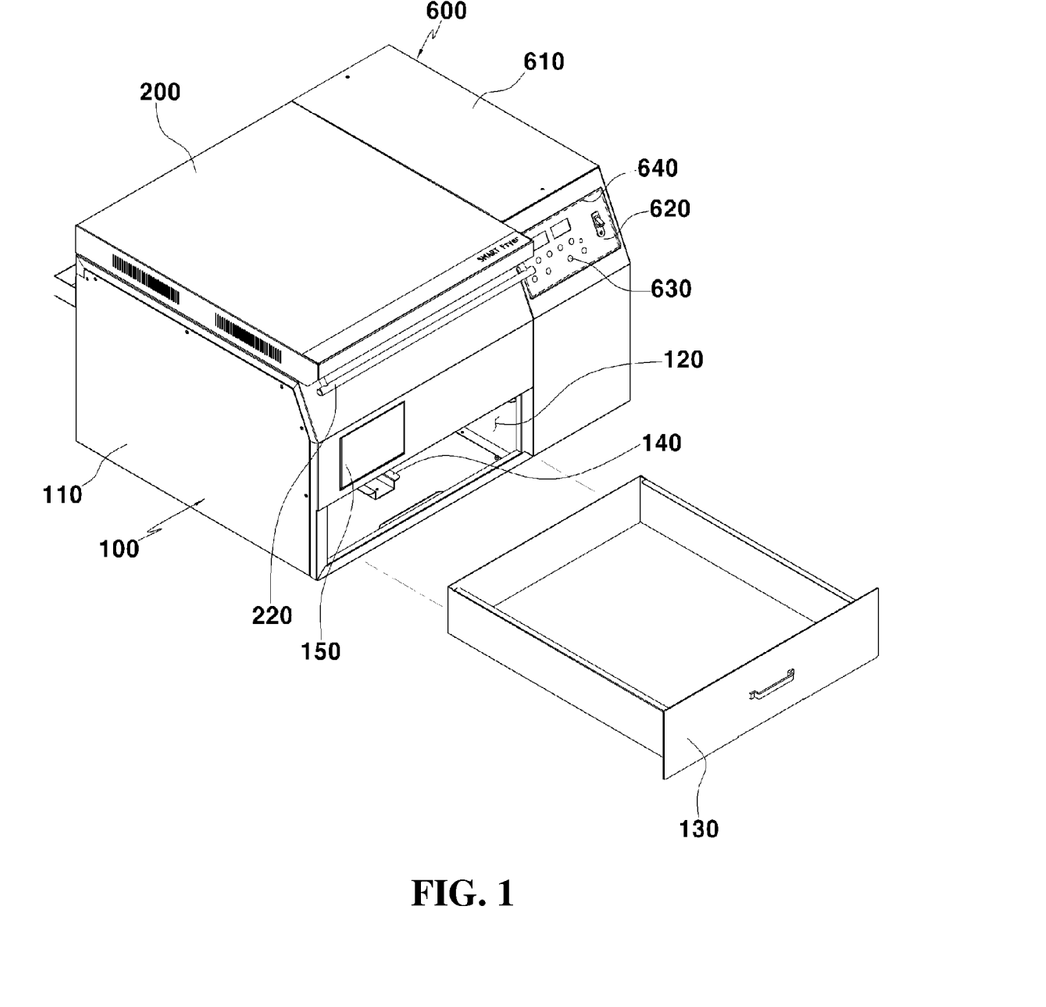
FIG. 1 is a perspective view of an induction fryer according to the present invention.
Figure 2:
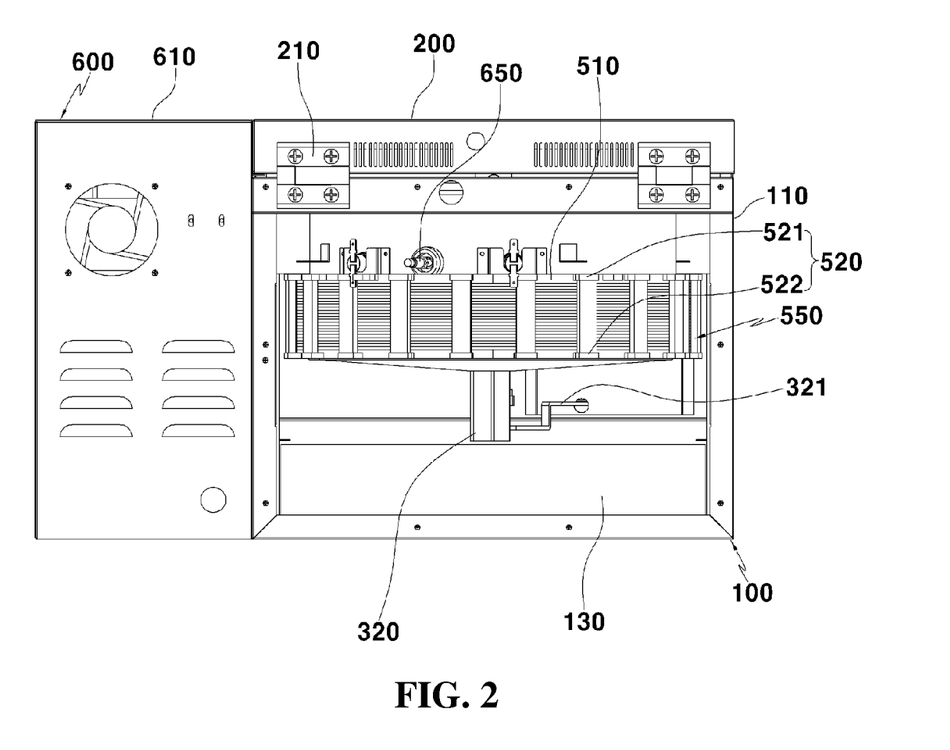
FIG. 2 is a view showing a rear side of the induction fryer according to the present invention.
Figure 3:
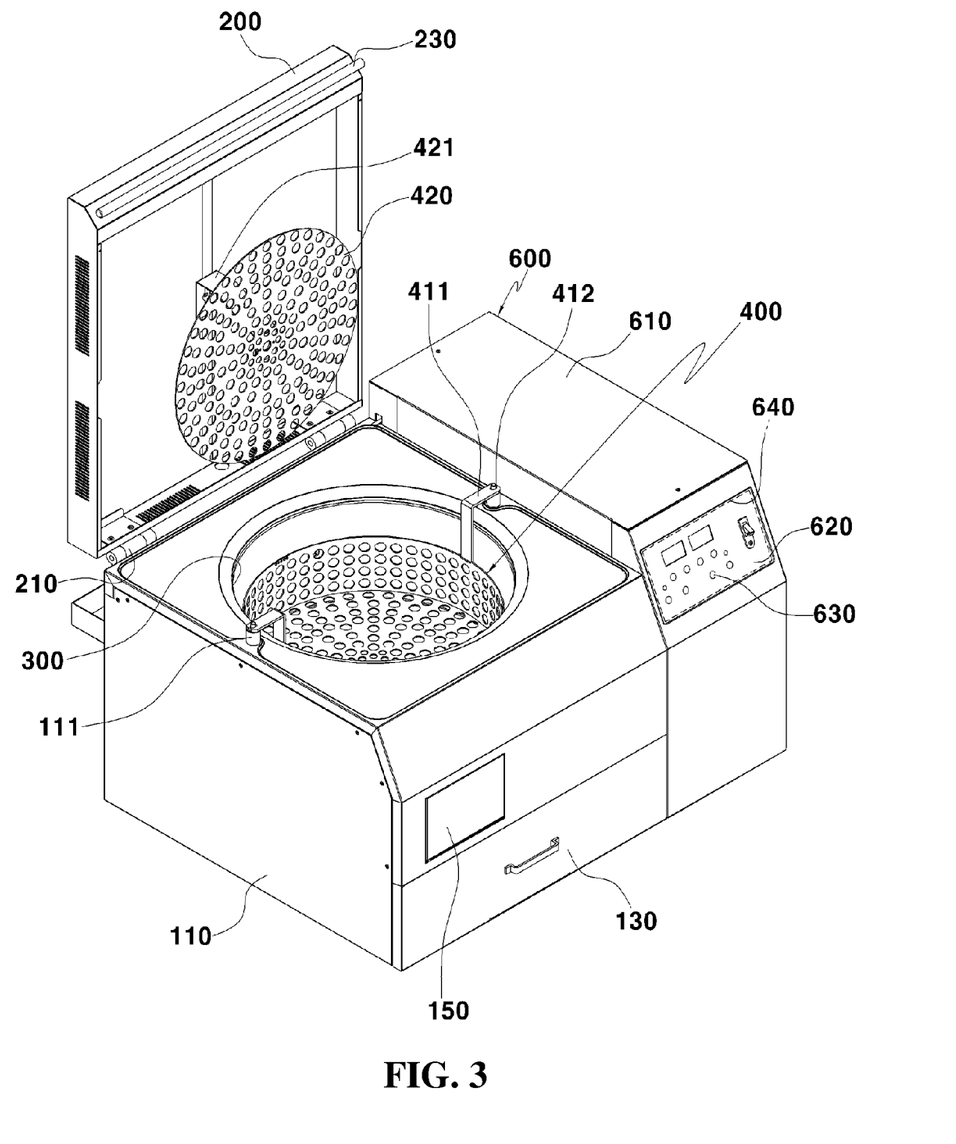
FIG. 3 is a view showing an open state of a cover of the induction fryer according to the present invention.
Figure 4:
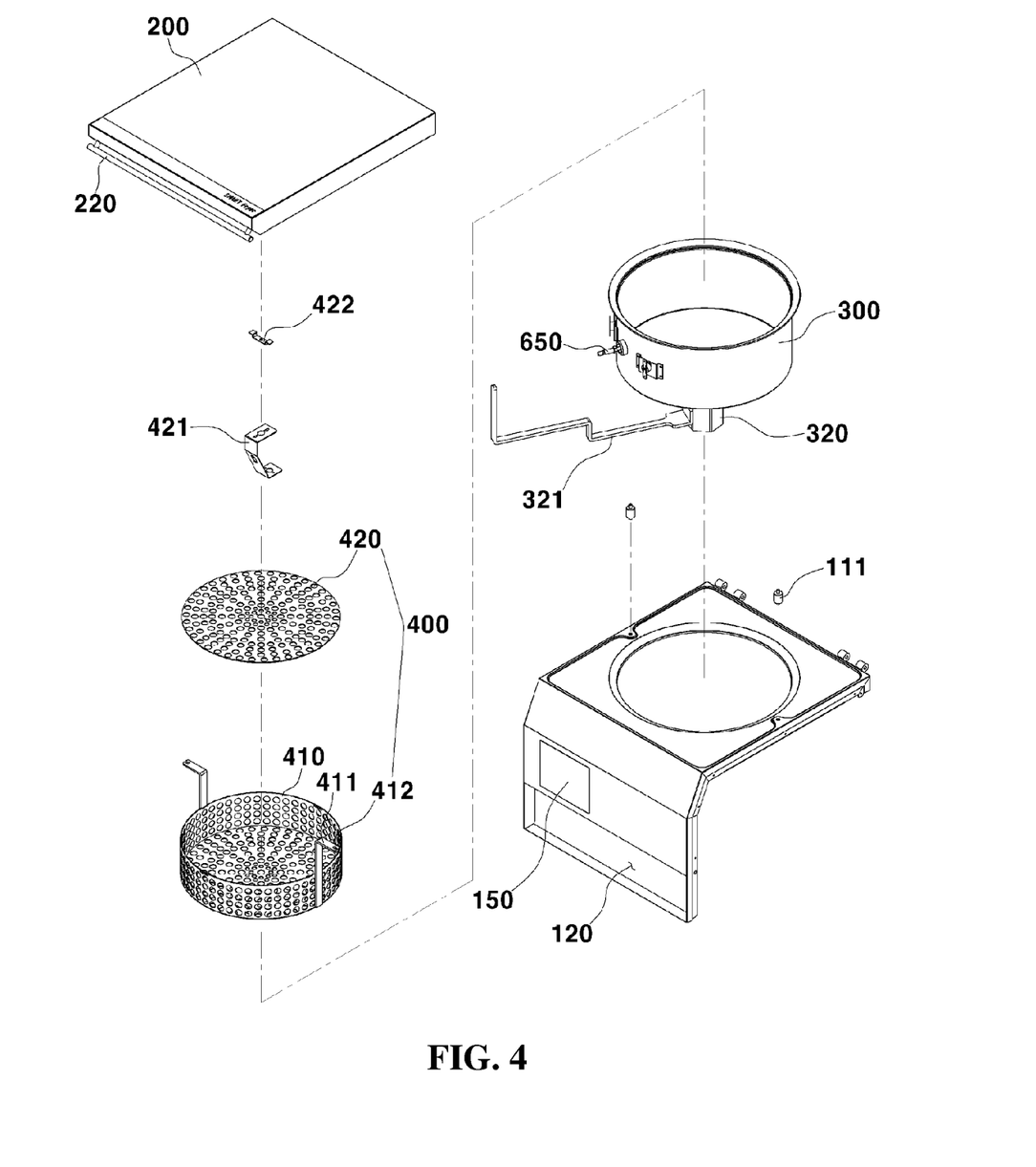
FIG. 4 is a view showing combination relations among a frying container, a frying basket and a basket cover of the induction fryer according to the present invention.
Figure 5:
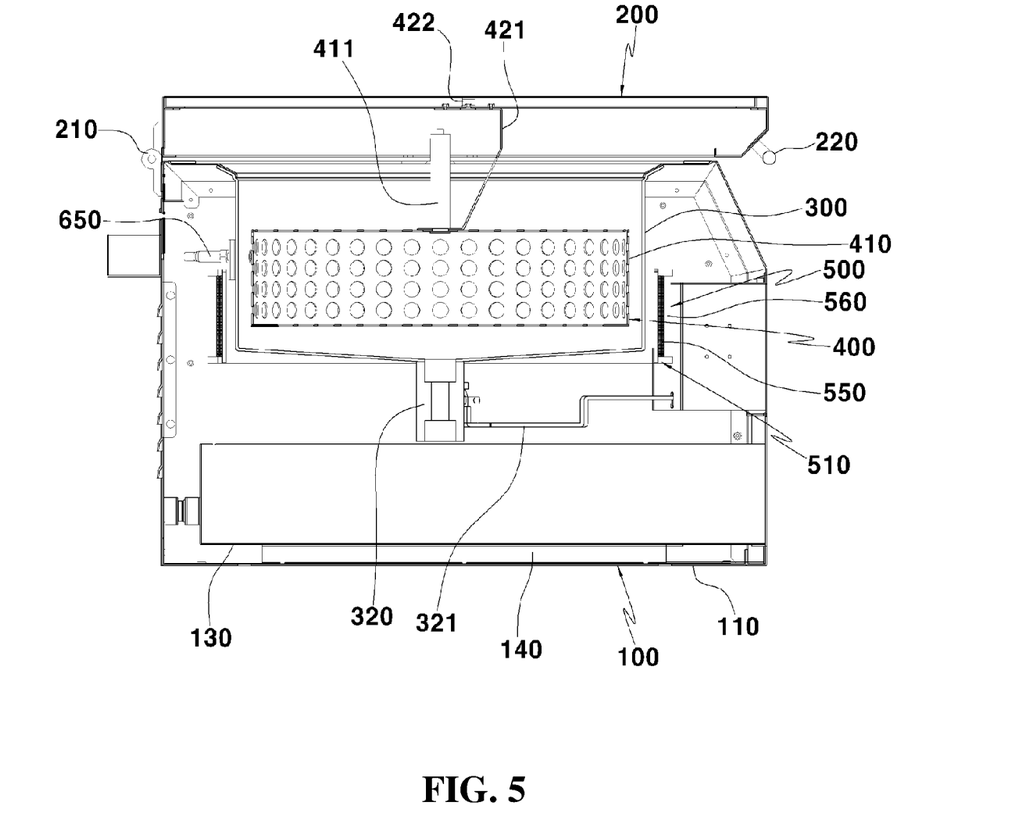
FIG. 5 is a sectional view showing a structure of the induction fryer according to the present invention.
Figure 6:
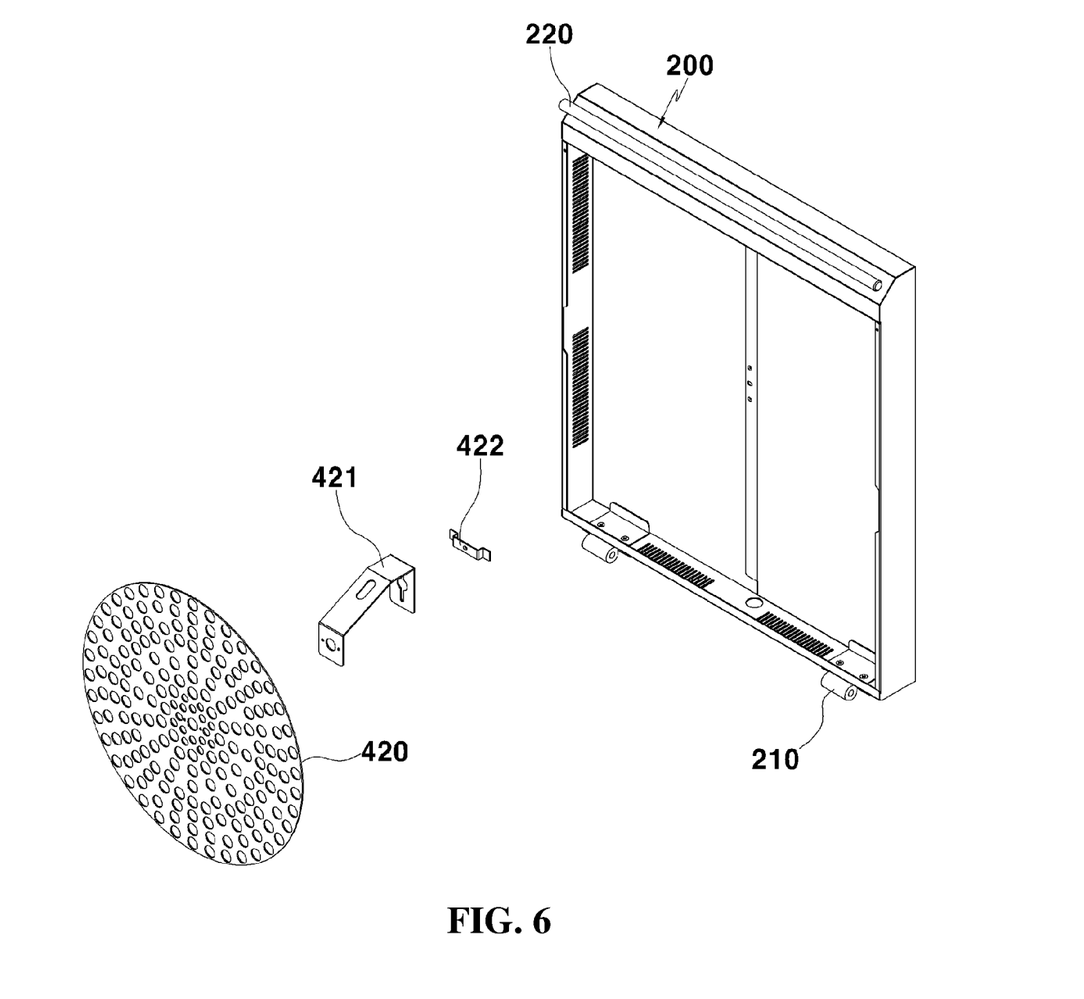
FIG. 6 is a view showing a combined state of a lid and the basket cover of the induction fryer according to the present invention.
Figure 7:
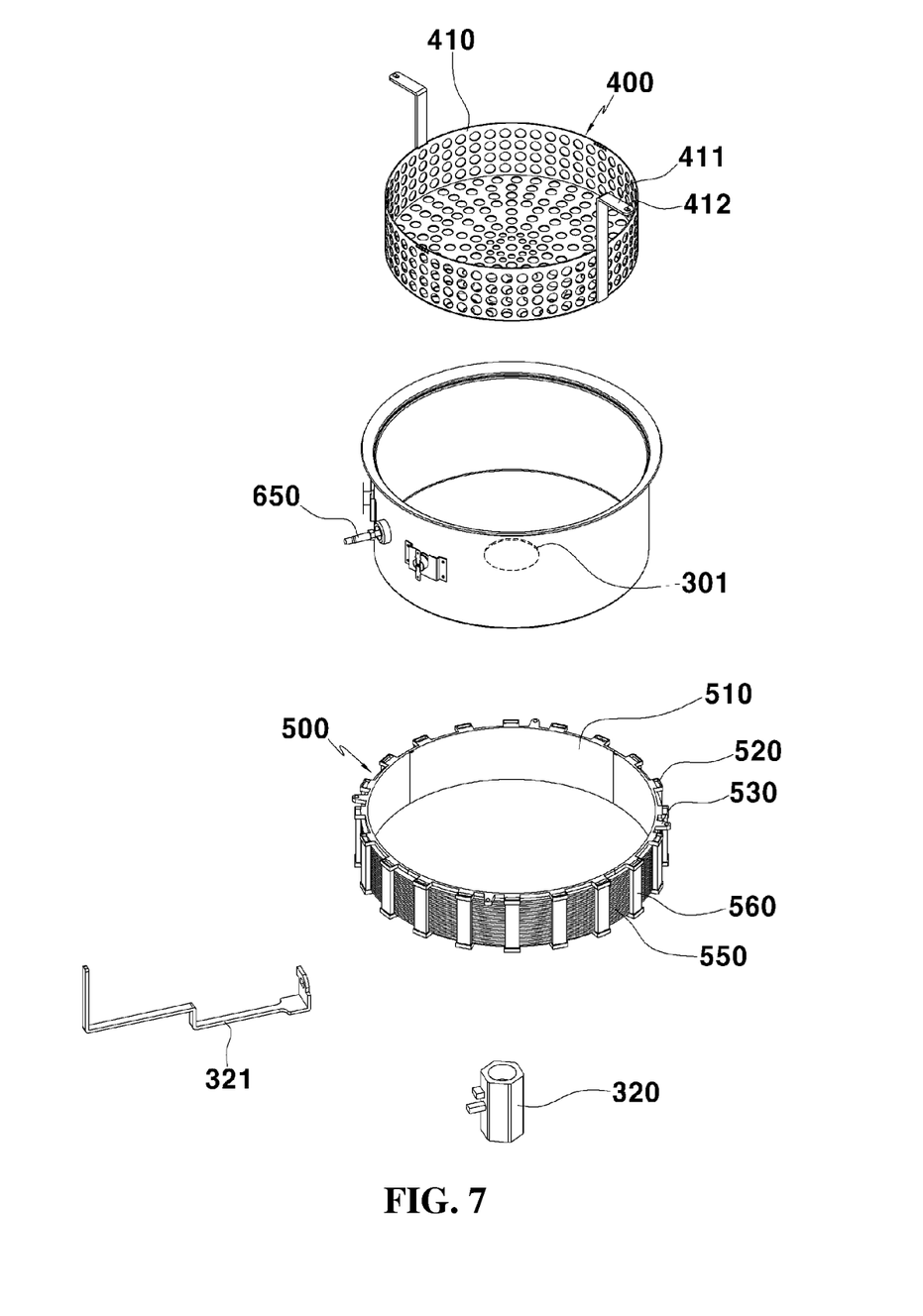
FIG. 7 is a view showing combination relations among the frying container, the frying basket and an induction heating unit.
Figure 8:
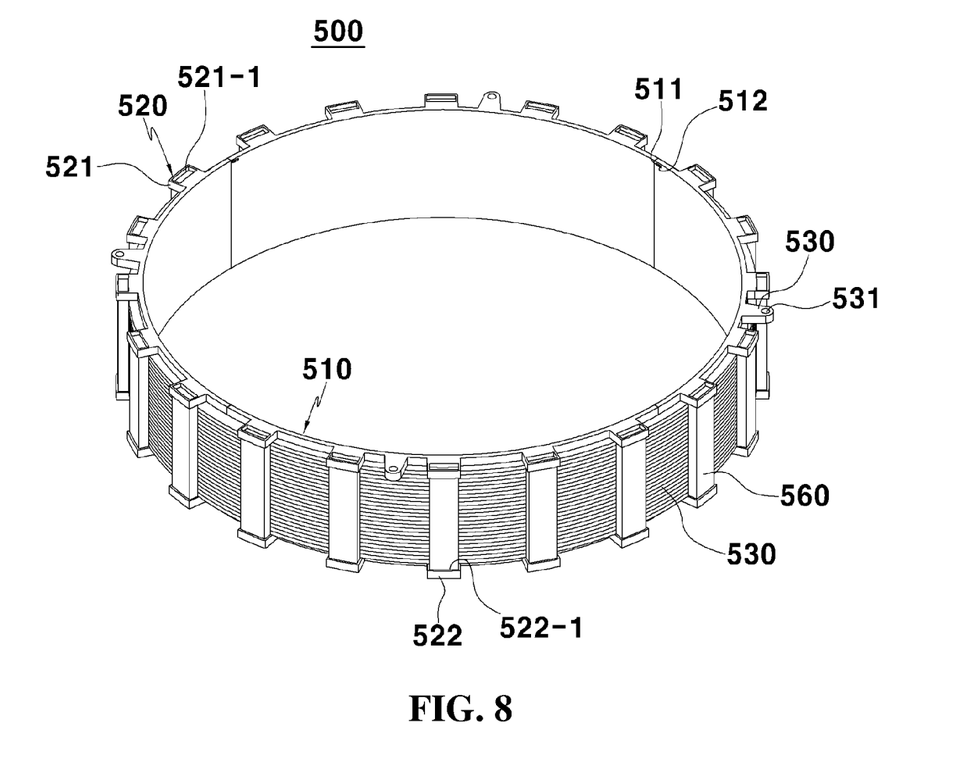
FIG. 8 is a view showing a structure of the induction heating unit.
Figure 9:
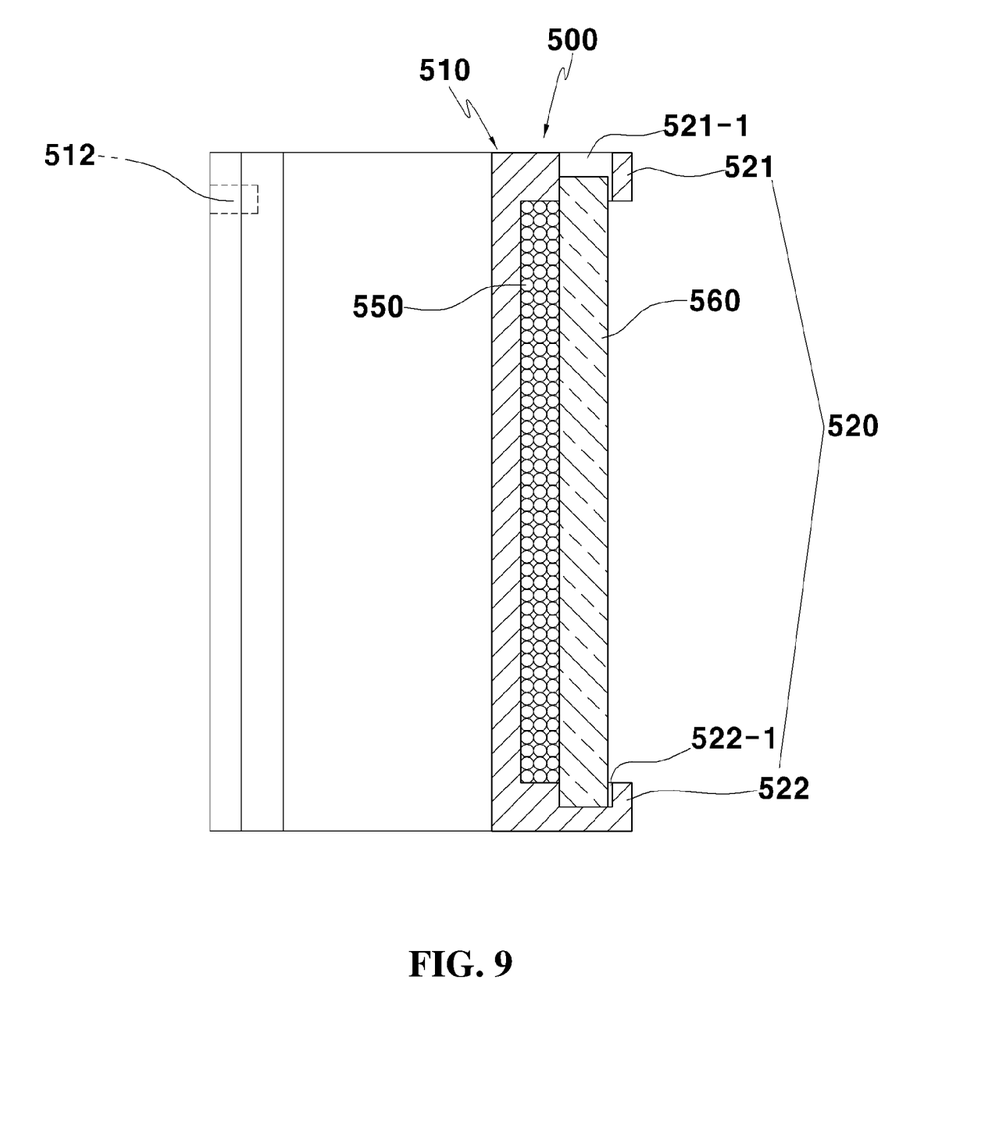
FIG. 9 is a sectional view of the induction heating unit of FIG. 8.
Figure 10:
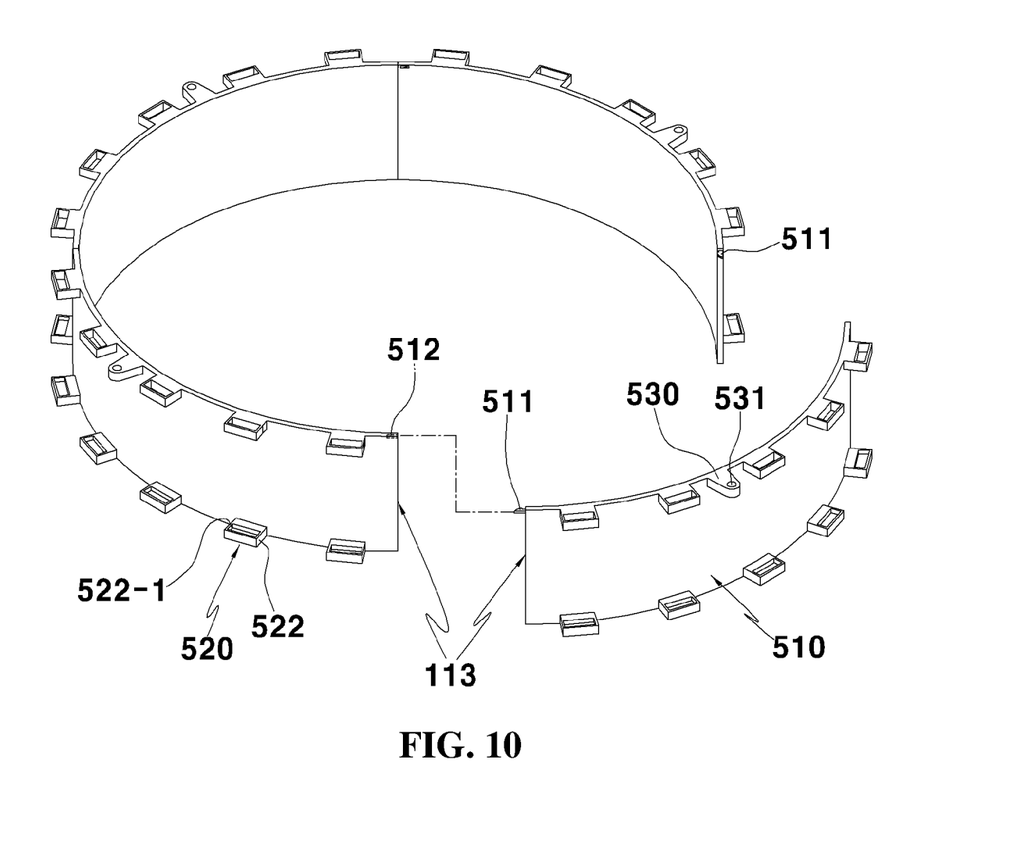
FIG. 10 is a view showing a structure of an assembly body of FIG. 8.
Figure 11:
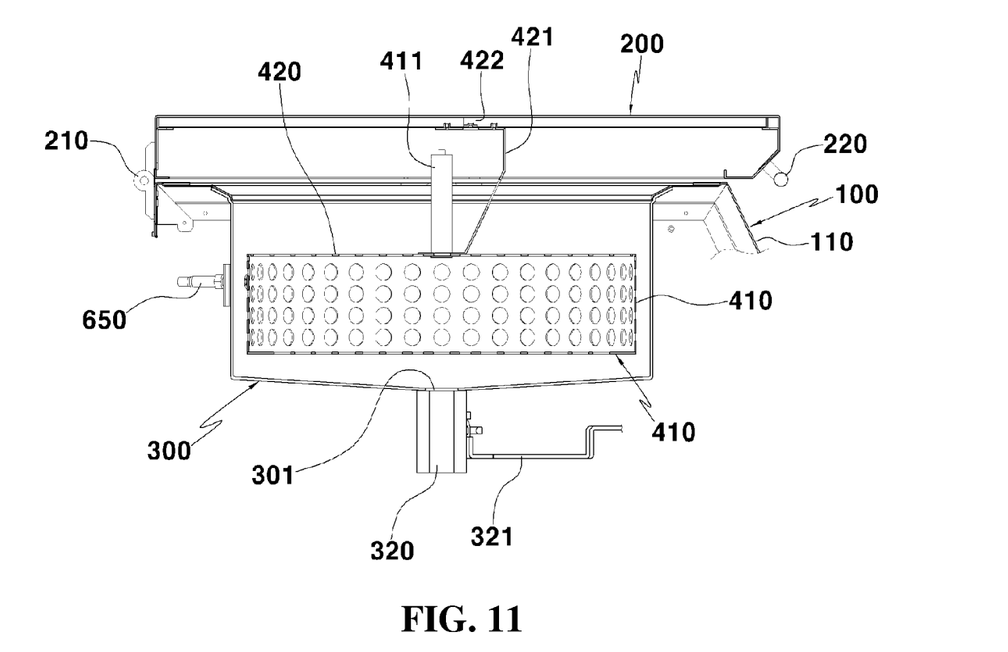
FIG. 11 is a view showing a structure of a state where the basket cover is closed to the frying basket.
Figure 12:
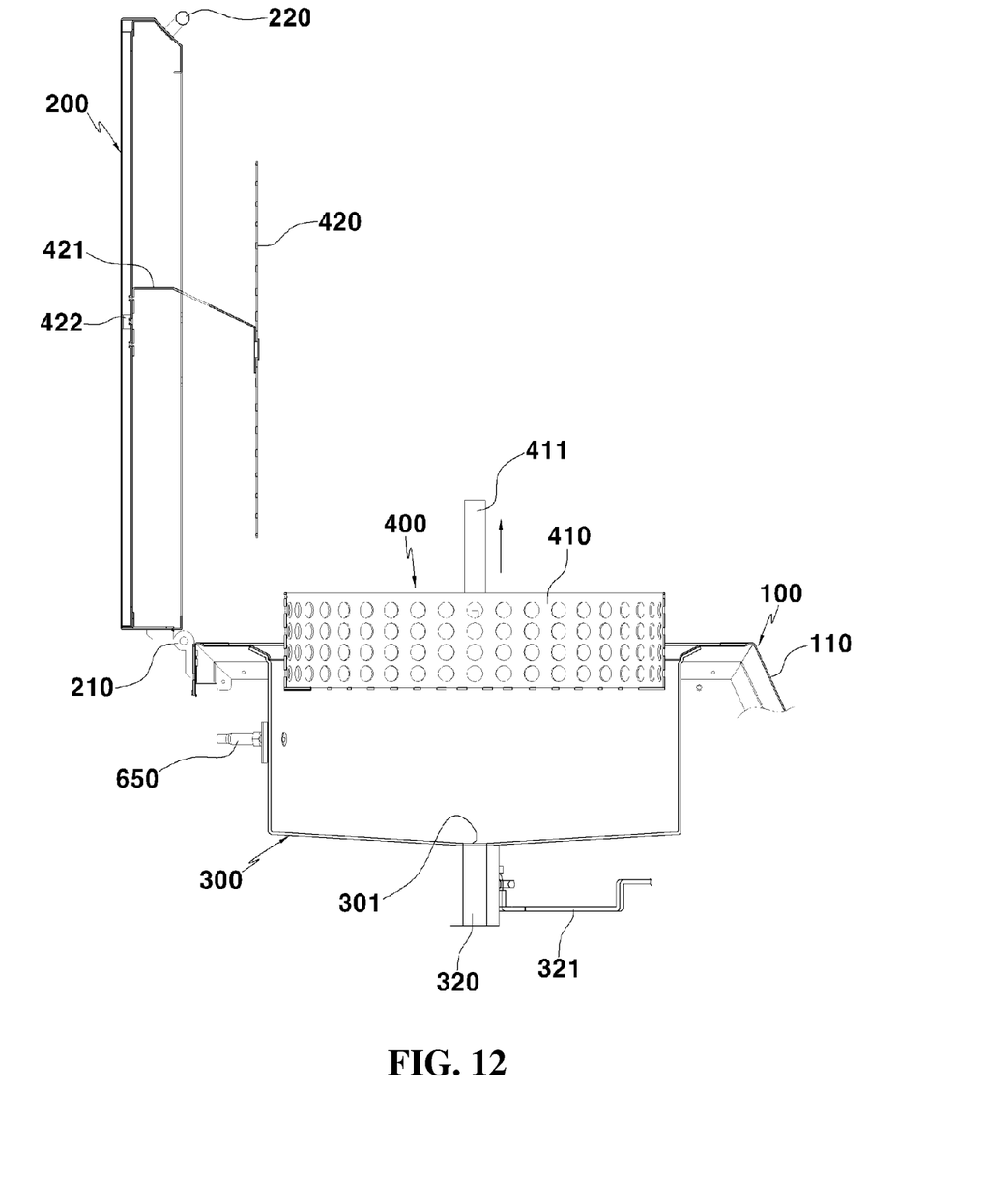
FIG. 12 is a view showing a state where the frying basket rises upwardly from the frying container.

FIG. 1 is a perspective view of an induction fryer according to the present invention, FIG. 2 is a view showing a rear side of the induction fryer according to the present invention, FIG. 3 is a view showing an open state of a cover of the induction fryer according to the present invention, FIG. 4 is a view showing combination relations among a frying container, a frying basket and a basket cover of the induction fryer according to the present invention, FIG. 5 is a sectional view showing a structure of the induction fryer according to the present invention, FIG. 6 is a view showing a combined state of a lid and the basket cover of the induction fryer according to the present invention, FIG. 7 is a view showing combination relations among the frying container, the frying basket and an induction heating unit, FIG. 8 is a view showing a structure of the induction heating unit, FIG. 9 is a sectional view of the induction heating unit of FIG. 8, FIG. 10 is a view showing a structure of an assembly body of FIG. 8, FIG. 11 is a view showing a structure of a state where the basket cover is closed to the frying basket, and FIG. 12 is a view showing a state where the frying basket rises upwardly from the frying container.

Referring to FIGS. 1 to 12, the induction fryer according to the present invention includes a case 100, a lid 200, a frying container 300, a frying basket 400, an induction heating unit 500, and a control unit 600.

The case 100 includes a case body 110 having an open upper portion and a predetermined space formed therein, a plurality of mounting holes (no reference numeral) formed at the upper portion of the case body 110, and seating members 111 mounted in the mounting holes so that fixing rods 411 of a basket body 410, which will be described later, are combined with the seating members.

The case body 110 has an opening portion (no reference numeral) formed at the rear side, a rear cover (no reference numeral) is mounted at the opening portion, and the rear cover is fixed to the case body 110 by bolts.

An oil collecting hole 120 is formed in the front surface of the case body 110, a collecting drawer 130 is mounted in the oil collecting hole 120 to contain oil therein, and rails 140 are mounted inside the case body 110 so that the collecting drawer 130 can easily go into and out of the case body 110.

A door 150 is openably mounted on the front surface of the case body 110 so that a user can manipulate an operation lever 321 to discharge oil to the collecting drawer 130.

The lid 200 is mounted at the upper portion of the case 110 to rotate by a hinge 210, and has a handgrip 220 mounted on the front surface of the lid.

Moreover, the lid 200 includes a plurality of 'ㄱ'-shaped connection members 230 mounted at inner edge portions thereof, so the connection members 230 increase firmness of the lid 200.

The frying container 300 is mounted at the upper portion of the case 100 and has a predetermined space so that the user can put oil in the frying container 300. Furthermore, the frying container 300 includes: a discharge hole 301 formed in the inner bottom surface; a discharge tube 310 fixed at the bottom of the frying container 300 by welding and mounted in the discharge hole 301; a valve 320 mounted at the discharge tube 310 to selectively discharge frying oil; and an operation lever 321 mounted from the valve 320 to one side of the door 150 of the case body 110.

The frying basket 400 includes a basket body 410 of a cylindrical shape, and is mounted inside the frying container 300 to be able to go in and out. 'ㄱ'-shaped fixing rods 411 are mounted integrally with both sides of the frying basket 400, and fixing holes 412 are formed in the fixing rods 411 to be combined with the seating members 111. The fixing holes 412 are combined with upper portions of the seating members 111.

The frying basket 400 further includes a circular basket cover 420 formed at the upper portion, and the basket cover 420 is mounted on the bottom of the lid 200. The basket cover 420 is covered on the upper portion of the frying basket 400 when frying ingredients are fried by oil.

The basket cover 420 has a 'ㄷ'-shaped cover piece 421 combined with one side of the basket cover 420 to make the basket cover 420 get in contact with the upper portion of the frying basket 400 by elasticity, and a fixing piece 422 is combined with one side of the cover piece 421.

When the user adjusts the position of the cover piece 421 combined with the fixing piece 422, the basket cover 420 can be exactly located on the upper portion of the frying basket 400.

The induction heating unit 500 includes a plurality of assembly bodies 510. As shown in the drawings, the assembly bodies 510 are connected with one another in a circle. When the user adjusts the number of the connected assembly bodies 510, the diameter of the circle formed by the connected assembly bodies 510 can be adjusted.

Each of the assembly bodies 510 has a retaining protrusion 511 and a retaining groove 512 formed at one side of the rear surface so that the assembly body 510 can be connected with another assembly body 510. The retaining protrusion 511 and the retaining groove 512 are coupled in a hook type, so that the plurality of assembly bodies 510 can be formed in a circle.

Additionally, a protrusion part 113 on which the retaining protrusion 511 and the retaining groove 512 are formed protrudes in a direction that the frying container is located in order to maintain a certain distance between a coil 550 and the frying container and to easily cause the electromagnetic induction phenomenon.

In addition, a plurality of magnet fixing members 520 are formed at one side of the assembly body 510 so as to mount magnets 550. Each of the magnet fixing members 520 has an upper fixing protrusion 521 and a lower fixing protrusion 522.

The upper fixing protrusion 521 has a mounting slot 521-1 so that the magnet 550 can be inserted therein, and the lower fixing protrusion 522 has a mounting groove 522-1 so that the magnet 550 can be fit and seated thereon.

A combining protrusion 530 having a combining hole 531 is formed between the plurality of magnet fixing members 520 so as to be combined with a bolt of a mounting member (no reference numeral) mounted on the outer face of the frying container 300.

Moreover, the assembly body 510 has a fixing protrusion to which an end of the coil 200 is fixed so that the assembly body 510 can be easily connected with a controller (not shown) mounted on the case 110, and the fixing protrusion has a fixing hole in which the coil 550 is inserted.

The control unit 600 has a power line having an electric plug in order to apply commercial electricity.

The control unit 600 includes: a control box 610 mounted at one side of the case 100; an operating panel 620 mounted on the front surface of the control box 610 and having a plurality of buttons 630; and a control board 640 mounted on the rear surface of the operating panel 620, wherein the control board 640 has a micro controller unit (MCU) to control electromagnetic induction generated from the induction heating unit 500 and control time and temperature by the user's manipulation of the buttons 630.

The operating panel 620 has a display (no reference numeral) for displaying temperature and time, and the display shows temperature and time in a text form.

The buttons 630 include: a main button for supplying and blocking stand-by current through commercial electricity; a power button for controlling electricity to apply the commercial electricity applied by the main button to the induction heating unit 500 through the control board 640; a setting button for setting high frequency of the frying container 300; a temperature button for setting temperature of the frying container; a time button for setting time to fry; and a start/stop button for selecting start and stop of frying.

The control board 640 further includes: an MCU for controlling time, temperature and high frequency set by the buttons 630; and an electric network necessary for generating and blocking eddy current of the induction heating unit 500 and setting temperature through control of the MCU. The electric network includes a power supply circuit, and a smoothing circuit for stably supplying electric power. Furthermore, a timer, a speaker and others may be further included.

Additionally, the control board 640 is electrically connected with a temperature sensor 650, and the temperature sensor 650 is mounted from the outside to the inside of the frying container 300 to check temperature of oil.

The valve 320 is formed to protrude downwardly from the case body 110 so that the user can easily discharge oil contained in the frying container 300.

Now, an action of the induction fryer according to the present invention will be described.

In order to fry frying ingredients using the induction fryer according to the present invention, first, the user manipulates the buttons 630 of the operating panel 620 mounted at one side of the case 100 to fry the frying ingredients.

When the user manipulates the main button of the operating panel 620, commercial electricity is applied to the control board 640 mounted at the rear surface of the operating panel 620. When electricity is applied to the control board 640, the user pushes the power button of the operating panel 620.

After pushing the power button, the user pushes the setting button, pushes the temperature button 634 to set temperature to fry, and then, pushes the start/stop button.

When the user pushes the start/stop button, an operation signal is applied to the MCU of the control board 640 mounted at the rear surface of the operating panel 620. After that, the MCU applies electricity to the coil 520 of the induction heating unit 500 mounted on the outer circumferential surface of the frying container to convert electric energy into thermal energy through electromagnetic induction.

As described above, oil in the frying container 300 is heated by the induction heating unit 500, and in this instance, temperature rises up to the set temperature set by the operating panel 620.

Furthermore, because the temperature sensor 650 mounted on the frying container 300 maintains the set temperature, the induction fryer can easily fry the ingredients. Additionally, the user can feel the natural tastes of the frying ingredients since the user can set temperature differently according to frying ingredients.

The temperature set by the operating panel 620 is applied to the MCU of the control board 640, and the MCU applies a control signal to the induction heating unit 500 to maintain the temperature set by the user.

When temperature of the oil in the frying container 300 rises to the set temperature, the user opens the lid 200 to fry the frying ingredients, and grasps the fixing rod 411 to expose the basket body 410 above the case 100. The user puts frying ingredients into the exposed basket body 410, and then, pushes the basket body 410 into the frying container 300 to fry the frying ingredients.

Moreover, the user closes the lid 200 to prevent oil vapor from spattering around the induction fryer while the frying ingredients are fried.

The frying ingredients put in the basket body 410 are fried up to the set time. When the set time is up, the induction fryer generates a sound so that the user realizes it and stops electromagnetic induction heating.

When frying of the frying ingredients put in the basket body 410 is finished, the user opens the lid 200 and lifts the basket body 410 upwardly. When the basket body 410 is separated and rises from the seating members 111 combined with the fixing rods 411, the user takes out the fried ingredients from the basket body 410.

As described above, the induction fryer according to the present invention can provide fried food with good texture since temperature of oil is adjusted by the induction heating unit 500 and the frying ingredients are fried at proper temperature.

Moreover, because the induction heating unit 500 for raising temperature of oil does not generate residual heat in a state where power supply is cut off, the induction fryer according to the present invention can minimize acidification of the oil contained in the frying container 300.

While the exemplary embodiments of the present invention have been described in more detail with reference to the accompanying drawings, but the present invention is not essentially limited to the exemplary embodiments, and it will be understood by those of ordinary skill in the art that various modifications and equivalents may be made without deviating from the spirit or scope of the invention.

INDUSTRIAL APPLICABILITY

The present invention is available to fryers using electromagnetic induction heating in a wide use.

The invention claimed is:

1. An induction fryer comprising:
a case having a predetermined space with an open upper part;
a lid mounted at an upper part of the case to be opened and closed by a hinge;
a frying container mounted in the case for containing oil to fry frying ingredients;
a frying basket having a space for holding the frying ingredients and having a fixing rod to lift the frying basket up and down in the frying container;
an induction heating unit mounted on an outer circumferential surface of the frying container and configured to covert electric energy into thermal energy; and
a control unit for electrically controlling the induction heating unit to fry the frying ingredients by an electromagnetic induction phenomenon,
wherein the induction heating unit (500) includes:
a plurality of assembly bodies mounted on the outer circumferential surface of the frying container;
a coil mounted along outer circumferential surfaces of the plurality of assembly bodies;
a plurality of magnets for fixing the coil, the plurality of magnets being fixed to upper fixing protrusions and lower fixing protrusions of the plurality of assembly bodies,
wherein each of the assembly bodies includes:
a retaining protrusion formed at one side thereof;
a retaining groove formed at another side thereof to correspond to the retaining protrusion;
magnet fixing members having the upper fixing protrusions and the lower fixing protrusions, wherein each of the upper fixing protrusions is formed at an upper portion of one side of the respective assembly body and has a mounting slot, and each of the lower fixing protrusions has a mounting groove formed at a lower portion of an outer face of the respective assembly body to correspond to the respective upper fixing protrusion;
a combining protrusion which is mounted between the upper fixing protrusions so that the respective assembly body is fixed on an inner face of the case; and
a fixing protrusion which is formed between the upper fixing protrusions and to which an end of the coil is fixed so that the respective assembly body is electrically connected with the control board.

2. The induction fryer according to claim 1, wherein the frying basket includes:
a basket body mounted in the frying container to go in and out so that the frying ingredients is fried by oil;
fixing rods mounted on a side of the basket body to be combined with seating members mounted at an upper portion of the case body; and
a basket cover mounted at one side of the lid by a cover piece and a fixing piece to be combined with an upper portion of the basket body.

3. The induction fryer according to claim 1, wherein the control unit includes:
a control box having a predetermined space and mounted on the case;
an operating panel having a plurality of buttons to control the induction heating unit and mounted on a front surface of the control box; and
a control board mounted on a rear surface of the operating panel and having a circuit and a micro controller unit (MCU) to control the electromagnetic induction phenomenon of the induction heating unit for controlling power supply and setting frying temperature and time.

* * * * *